US010865317B2

(12) United States Patent
Megaridis et al.

(10) Patent No.: US 10,865,317 B2
(45) Date of Patent: Dec. 15, 2020

(54) LOW-FLUORINE COMPOSITIONS WITH CELLULOSE FOR GENERATING SUPERHYDROPHOBIC SURFACES (71) Applicants: KIMBERLY-CLARK WORLDWIDE, INC., Neenah, WI (US); BOARD OF TRUSTEES OF THE UNIVERSITY OF ILLINOIS, Urbana, IL (US)

(72) Inventors: Constantine Michael Megaridis, Oak Park, IL (US); Jared Morrissette, Chicago, IL (US); Patrick Carroll, Chicago, IL (US); Ilker S. Bayer, Genoa (IT); Jian Qin, Neenah, WI (US); Donald E. Waldroup, Roswell, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 777 days.

(21) Appl. No.: 15/692,033

(22) Filed: Aug. 31, 2017

(65) Prior Publication Data
US 2019/0062570 A1 Feb. 28, 2019

(51) Int. Cl.
*B01J 20/24* (2006.01)
*C09D 5/16* (2006.01)
*B01J 20/26* (2006.01)
*C09D 123/28* (2006.01)
*B01J 20/32* (2006.01)
*C08L 1/02* (2006.01)

(52) U.S. Cl.
CPC ............ *C09D 5/1681* (2013.01); *B01J 20/24* (2013.01); *B01J 20/264* (2013.01); *B01J 20/265* (2013.01); *B01J 20/3272* (2013.01); *B01J 20/3276* (2013.01); *C08L 1/02* (2013.01); *C09D 123/28* (2013.01); *C09D 123/283* (2013.01)

(58) Field of Classification Search
CPC ....... B01J 20/24; B01J 20/265; C09D 5/1681; C09D 23/283
USPC ......................................................... 502/402
See application file for complete search history.

(56) References Cited

U.S. PATENT DOCUMENTS

| 8,372,764 | B2 | 2/2013 | Yano et al. |
| 8,686,070 | B2 | 4/2014 | Bakeev et al. |
| 8,771,463 | B2 | 7/2014 | Umemoto et al. |
| 8,900,406 | B2 | 12/2014 | Miguel et al. |
| 8,980,054 | B2 | 3/2015 | Yang et al. |
| 9,181,653 | B2 | 11/2015 | Paltakari et al. |
| 9,217,094 | B2 | 12/2015 | Megaridis et al. |
| 9,364,859 | B2 | 6/2016 | Qin et al. |
| 2001/0017102 | A1 | 8/2001 | Caldwell |
| 2002/0170690 | A1 | 11/2002 | Buchsel et al. |
| 2005/0106326 | A1 | 5/2005 | Audenaert et al. |
| 2005/0136773 | A1 | 6/2005 | Yahiaoui et al. |
| 2008/0145664 | A1 | 6/2008 | Sirovatka et al. |
| 2011/0260348 | A1 | 10/2011 | Gardner et al. |
| 2013/0000855 | A1 | 1/2013 | Nuopponen et al. |
| 2013/0273368 | A1 | 10/2013 | Cingolani et al. |
| 2014/0079931 | A1 | 3/2014 | Berglund et al. |
| 2014/0113144 | A1 | 4/2014 | Loth et al. |
| 2014/0238626 | A1 | 8/2014 | Tsuji et al. |
| 2014/0295724 | A1 | 10/2014 | Sworen et al. |
| 2014/0323002 | A1 | 10/2014 | Qin et al. |
| 2014/0323633 | A1 | 10/2014 | Megaridis et al. |
| 2014/0370305 | A1 | 12/2014 | Tria et al. |
| 2015/0132742 | A1 | 5/2015 | Thuo et al. |
| 2015/0308017 | A1 | 10/2015 | Backfolk et al. |
| 2016/0090508 | A1 | 3/2016 | Sworen et al. |
| 2016/0090560 | A1 | 3/2016 | Sworen et al. |
| 2016/0090686 | A1 | 3/2016 | Sworen et al. |
| 2016/0090687 | A1 | 3/2016 | Sworen et al. |
| 2016/0153144 | A1 | 6/2016 | Hiltunen et al. |

FOREIGN PATENT DOCUMENTS

| WO | 2005077429 A1 | 8/2005 |
| WO | 2011161173 A1 | 12/2011 |
| WO | WO 2015/033026 A1 | 3/2015 |
| WO | WO 2015/080335 A1 | 6/2015 |
| WO | WO 2015/160684 A1 | 10/2015 |
| WO | WO 2015/171714 A1 | 11/2015 |

(Continued)

OTHER PUBLICATIONS

Chirayil, Cintil Jose et al., "Review of Recent Research in Nano Cellulose Preparation from Different Lignocellulosic Fibers," Reviews on Advanced Materials Science, vol. 37, 2014, pp. 20-28.
Khalil, H.P.S. Abdul et al., "Production and Modification of Nanofibrillated Cellulose Using Various Mechanical Processes: A Review," Carbohydrate Polymers, vol. 99, 2014, pp. 649-665.
Lai, Yuekun et al., "Transparent Superhydrophobic/Superhydrophilic $TiO_2$-Based Coatings for Self-Cleaning and Anti-Fogging," Journal of Materials Chemistry, vol. 22, 2012, pp. 7420-7426.
Liu, Kesong and Lei Jiang, "Bio-Inspired Self-Cleaning Surfaces," Annual Review of Materials Research, vol. 42, Aug. 2012, pp. 231-263.

(Continued)

*Primary Examiner* — Edward M Johnson
(74) *Attorney, Agent, or Firm* — Kimberly-Clark Worldwide, Inc.

(57) ABSTRACT

A composition configured to create a superhydrophobic surface includes a fluorinated hydrophobic component dispersible in an aqueous dispersion; cellulosic elements of a size ranging from 100 nm to 100 μm; and water. The hydrophobic component is selected from the group consisting of fluorinated polymers, perfluorinated polymers, and mixtures thereof; and the cellulosic elements are micro- and nano-fibrillated cellulose. A disposable absorbent article includes a substrate having a surface, the surface including a composition including a fluorinated hydrophobic component dispersible in an aqueous dispersion; cellulosic elements of a size ranging from 100 nm to 100 μm; and water, wherein the surface exhibits a contact angle greater than 150 degrees.

20 Claims, 3 Drawing Sheets

(56) References Cited

FOREIGN PATENT DOCUMENTS

| WO | WO 2016/069674 A1 | 5/2016 |
|---|---|---|
| WO | WO 2016/138272 A1 | 9/2016 |
| WO | WO 2016/138277 A1 | 9/2016 |

OTHER PUBLICATIONS

Missoum, Karim et al., "Nanofibrillated Celluose Surface Modification: A Review," Materials, vol. 6, 2013, pp. 1745-1766.
Schutzius, Thomas M. et al., "Water-Based, Nonfluorinated Dispersions for Environmentally Benign, Large-Area, Superhydrophobic Coatings," ACS Applied Materials & Interfaces, vol. 5, No. 24, Dec. 2, 2013, pp. 13419-13425.
Co-pending U.S. Appl. No. 16/641,586, filed Feb. 24, 2020, by Megaridis et al. for "Non-Fluorinated Water-Based Compositions with Plant-Based Materials for Generating Superhydrophonbic Surfaces."
Co-pending U.S. Appl. No. 16/641,976, filed Feb. 25, 2020, by Qin et al. for "Superhydrophobic Surfaces Using Non-Fluorinated Compositions with Plant-Based Materials."
Co-pending U.S. Appl. No. 16/492,665, filed Feb. 27, 2020, by Qin et al. for "Nanofibrillated Cellulose Fibers."

LOW-FLUORINE COMPOSITIONS WITH CELLULOSE FOR GENERATING SUPERHYDROPHOBIC SURFACES

BACKGROUND

The present disclosure relates to surfaces that exhibit superhydrophobic properties when treated with a composition including a water-based, non-organic solvent.

A superhydrophobic surface exhibits a sessile water contact angle of greater than 150°. If, additionally, the surface exhibits a water droplet roll-off (sliding) angle of less than 10°, the surface is deemed to be "self-cleaning." In nature, lotus leaves exhibit such properties (so-called lotus effect). Most man-made materials, such as fabrics, nonwovens, cellulose tissues, polymer films, etc., do not have surfaces with such properties. Currently, there are generally two methods to modify a non-superhydrophobic surface to achieve the lotus effect. One method is to graft a hydrophobic monomer onto every surface of a non-superhydrophobic material. Such a method can make the material superhydrophobic throughout the thickness of the material, which might not be desired in most cases. It is also not cost effective, cannot be used for a continuous production, and can lead to undesirable environment issues. Another approach is to coat a specially formulated liquid dispersion onto a surface, and upon subsequent drying, a nano-structured superhydrophobic film forms. To use such an approach, the deposited film must exhibit a chemical and physical morphology characteristic of superhydrophobic surfaces. First, the formulation requires at least one low-surface energy (i.e., hydrophobic) component, such as a perfluorinated polymer (e.g., polytetrafluoroethylene), and second, the treated surface has to have a rough surface texture, preferably at several length-scales—micro and nano-roughness.

This process becomes further complicated due to processing concerns, where harsh solvents are undesirable from an environmental and manufacturing perspective. The choice of hydrophobic particle or polymer that can be dispersed in water is then limited. In addition, various nanoparticles are undesirable from a processing standpoint due to their ability to become airborne and ingested, and are likewise undesirable for the end-user for the same size-scale related reasons. Although various formulated dispersions capable of achieving a superhydrophobic surface exist, none of these dispersions appear to be purely water-based. For a multitude of safety, health, economic, and environmental issues, it is also important that the dispersion be fully aqueous-based when regarding commercial scale production, as this will decrease concerns associated with the use of organic solvents.

SUMMARY

Due to the bio-degradability of cellulose and its availability from so many sources it made sense as a hydrophilic particle that could be dispersed in water and used to create surface roughness. By combining this with a fluoro-polymer the resultant surface is hydrophobic and durable thanks to the strong adhesive property of cellulose.

In one aspect of the present disclosure, a composition configured to create a superhydrophobic surface includes a fluorinated hydrophobic component dispersible in an aqueous dispersion; cellulosic elements of a size ranging from 100 nm to 100 μm; and water.

In another aspect of the present disclosure, a composition configured to create a superhydrophobic surface includes a fluorinated hydrophobic component dispersible in an aqueous dispersion, wherein the hydrophobic component is selected from the group consisting of fluorinated polymers, perfluorinated polymers, and mixtures thereof; cellulosic elements of a size ranging from 100 nm to 100 μm, wherein the cellulosic elements are micro- and nano-fibrillated cellulose; and water.

In still another aspect of the present disclosure, a disposable absorbent article includes a substrate having a surface, the surface including a composition including a fluorinated hydrophobic component dispersible in an aqueous dispersion; cellulosic elements of a size ranging from 100 nm to 100 μm; and water, wherein the surface exhibits a contact angle greater than 150 degrees.

BRIEF DESCRIPTION OF THE FIGURES

The foregoing and other features and aspects of the present disclosure and the manner of attaining them will become more apparent, and the disclosure itself will be better understood by reference to the following description, appended claims and accompanying drawings, where:

Repeat use of reference characters in the present specification and drawings is intended to represent the same or analogous features or elements of the present disclosure.

The drawings are representational and are not necessarily drawn to scale. Certain proportions thereof might be exaggerated, while others might be minimized.

DETAILED DESCRIPTION OF THE DISCLOSURE

All percentages are by weight of the total composition unless specifically stated otherwise. All ratios are weight ratios unless specifically stated otherwise.

The term "superhydrophobic" refers to the property of a surface to repel water very effectively. This property is quantified by a water contact angle exceeding 150°. It should be noted that reference to a superhydrophobic composition does not necessarily mean that the composition itself is superhydrophobic, particularly if it is a water-based composition, but that the composition can applied to a surface, thus making the surface superhydrophobic.

The term "hydrophobic", as used herein, refers to the property of a surface to repel water with a water contact angle from about 90° to about 120°.

The term "hydrophilic", as used herein, refers to surfaces with water contact angles well below 90°.

The term "self-cleaning," as used herein, refers to the property to repel water with the water roll-off angle on a tilting surface being below 10°.

As used herein, the term "nonwoven web" or "nonwoven fabric" means a web having a structure of individual fibers or threads which are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters are usually expressed in microns, or in the case of staple fibers, denier. It is noted that to convert from osy to gsm, multiply osy by 33.91.

As used herein the term "spunbond fibers" refers to small diameter fibers of molecularly oriented polymeric material. Spunbond fibers can be formed by extruding molten thermoplastic material as fibers from a plurality of fine, usually circular capillaries of a spinneret with the diameter of the extruded fibers then being rapidly reduced as in, for example, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) can be achieved by various methods including, but not limited to, those described in commonly assigned U.S. Pat. No. 6,200,669 to Marmon et al. and U.S. Pat. No. 5,759,926 to Pike et al.

Meltblown nonwoven webs are prepared from meltblown fibers. As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers are microfibers which can be continuous or discontinuous, are generally smaller than 10 microns in average diameter (using a sample size of at least 10), and are generally tacky when deposited onto a collecting surface.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments which have been formed from at least two polymers extruded from separate extruders but spun together to form one fiber. Multicomponent fibers are also sometimes referred to as "conjugate" or "bicomponent" fibers or filaments. The term "bicomponent" means that there are two polymeric components making up the fibers. The polymers are usually different from each other, although conjugate fibers can be prepared from the same polymer, if the polymer in each component is different from one another in some physical property, such as, for example, melting point, glass transition temperature or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber can be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al. For two component fibers or filaments, the polymers can be present in ratios of 75/25, 50/50, 25/75 or any other desired ratios.

As used herein, the term "multiconstituent fibers" refers to fibers which have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Fibers of this general type are discussed in, for example, U.S. Pat. Nos. 5,108,827 and 5,294,482 to Gessner.

As used herein, the term "substantially continuous fibers" is intended to mean fiber that have a length which is greater that the length of staple fibers. The term is intended to include fibers which are continuous, such as spunbond fibers, and fibers which are not continuous, but have a defined length greater than about 150 millimeters.

As used herein, the term "staple fibers" means fibers that have a fiber length generally in the range of about 0.5 to about 150 millimeters. Staple fibers can be cellulosic fibers or non-cellulosic fibers. Some examples of suitable non-cellulosic fibers that can be used include, but are not limited to, polyolefin fibers, polyester fibers, nylon fibers, polyvinyl acetate fibers, and mixtures thereof. Cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally are composed of derivatives of cellulose formed by substitution of appropriate radicals (e.g., carboxyl, alkyl, acetate, nitrate, etc.) for hydroxyl groups along the carbon chain.

As used herein, the term "pulp" refers to fibers from natural sources such as woody and non-woody plants. Woody plants include, for example, deciduous and coniferous trees. Non-woody plants include, for example, cotton, flax, esparto grass, milkweed, straw, jute, hemp, and bagasse.

As used herein, "tissue products" are meant to include facial tissue, bath tissue, towels, hanks, napkins and the like. The present disclosure is useful with tissue products and tissue paper in general, including but not limited to conventionally felt-pressed tissue paper, high bulk pattern densified tissue paper, and high bulk, uncompacted tissue paper.

The present disclosure relates to a surface of a substrate, or the substrate itself, exhibiting superhydrophobic characteristics when treated with a formulation including a hydrophobic component, nano-/micro-structured particles, and water. The superhydrophobicity can be applied either over the entire surface, patterned throughout or on the substrate material, and/or directly penetrated through the z-directional thickness of the substrate material.

Hydrophobic Component

The hydrophobic component is a hydrophobic polymer that is dispersible in water to form the basic elements of the superhydrophobic properties of the present disclosure. In general, a hydrophobic component of this disclosure can include, but is not limited to, fluorinated or perfluorinated polymers. However, due to low degree of water dispersibility, the fluorinated or perfluorinated polymer can need to be modified by introducing a comonomer onto their molecular structure. Suitable comonomers include, but are not limited to, ethylenically unsaturated monomers including functional groups which are capable of being ionized in water. One example is ethylenically unsaturated carboxylic acid, such as acrylic acid. The amount of the comonomer within the hydrophobic component is determined by balancing two properties: hydrophobicity and water dispersibility. One example of the hydrophobic component of this disclosure is a commercially available modified perfluorinated polymer compound available from DuPont as a water-based product under the trade name CAPSTONE ST-100. Due to its low surface energy, the polymer not only contributes to superhydrophobicity, but it can also act as a binder to adhere the nano- and/or micro-structured particles of the present disclosure onto the surface. Additionally, the polymer molecules can be modified to contain groups, such as amines, that can become charged upon pH reduction and alter the dynamics of hydrophobicity within the liquid dispersion. In such a case, the polymer can stabilize in water through partial interaction. Surfactants that are introduced into the composition can also behave as dispersants of the polymer, thereby also altering some of the hydrophobic mechanics.

The solid components of the present disclosure (i.e., polymer, nano- and/or micro-structured particles) can be present in an amount from about 0.1% to about 5.0%, or in an amount from about 1.0% to about 3.0% by weight of the solution. Such an amount is suitable for spray applications where higher concentrations of either polymer and/or nano- and/or micro-structured particles in the dispersion can lead to either viscoelastic behavior, resulting in either clogging of the spray nozzle or incomplete atomization and fiber formation, or dramatic increases in dispersion viscosity and thus nozzle clogging. It should be noted that this range is not fixed and that it is a function of the materials being used and the procedure used to prepare the dispersion. When a higher amount of the polymer is used, the surface structure is less desirable as it can lack the proper texture to be superhydrophobic. When a lower amount of the polymer is used, the binding is less desirable as the coating behaves more so as a removable powder coating. Additionally, it is desired that the polymer-to-particle weight ratio be about 4:1 or about 3:2, or about 1:1, or about 2:3, or about 1:4 to optimize the balance between low surface energy and desirable surface texture.

Non-Organic Solvent

The formulation used in treating the surface of the present disclosure eliminates the use of an organic solvent by carefully selecting the appropriate combination of elements to impart superhydrophobic characteristics. Preferably, the non-organic solvent is water. Any type of water can be used; however, demineralized or distilled water can be opted for use during the manufacturing process for enhanced capabilities. The use of water helps to reduce the safety concerns associated with making commercial scale formulations including organic solvents. For example, due to the high volatility and flammability of most organic solvents, eliminating such use in the composition reduces production safety hazards.

Additionally, production costs can be lowered with the elimination of ventilation and fire prevention equipment necessitated by organic solvents. Raw material costs can be reduced in addition to the transportation of such materials as an added advantage to utilizing the non-organic solvent formulation to arrive at the present disclosure. Further, because water is considered a natural resource, surfaces treated with solvents including water as their base can be considered healthier and better for the environment. The formulation used to treat the surface of the present disclosure includes greater than about 95%, greater than about 98%, or about 99% water, by weight of the dispersion composition.

Nano- and/or Micro-Structured Particles

Nano- and/or micro-structured particles, which we define here as particles exhibiting diameters approximately between 100 nm and 100 μm, are used in the present disclosure to achieve a desirable rough surface. The particles can be cellulosic particles and/or fibers. Although hydrophobic particles can be used, it is desirable that the particles of the present disclosure be hydrophilic. If hydrophobic particles are used, the particles can be treated by a surfactant prior to being dispersed in water in order to prevent agglomeration. When used, the amount of surfactant present must be kept at a low concentration such that the desired superhydrophobic properties are maintained. Therefore, the use of surfactants within the present disclosure should be from about 0%, or from about 0.25%, or from about 1.0% to no more than about 0.5%, or no more than about 1.5% or no more than about 2%, by weight of the total composition. Such surfactants can be nonionic, cationic, or anionic in nature. Suitable anionic surfactants can include, but are not limited to sulfonates, carboxylates, and phosphates. Suitable cationic surfactants can include, but are not limited to, quaternary amines. Suitable nonionic surfactants can include, but are not limited to, block copolymers containing ethylene oxide and silicone surfactants.

Other Ingredients

Binders

The hydrophobic polymers within the formulation of the present disclosure play a dual role in acting both as a hydrophobic component and a binder. Polymers such as DuPont's CAPSTONE ST-100 co-polymer promote adhesion, as compared to the fluorinated polymer alone, so that an additional binder within the composition is not necessary. If a water-dispersible hydrophobic polymer is used wherein an additional binder is needed, it is preferred that the binder is selected from water-dispersible acrylics, polyurethane dispersions, acrylic copolymers, or acrylic polymer precursors (which can cross link after the coating is cured).

The amount of the binder present within the formulation of the present disclosure can vary. A binder can be included in an effective amount of up to about 2.0% by weight of the total dispersion composition.

Stabilizing Agent

The formulation within the present disclosure can be additionally treated with a stabilizing agent to promote the formation of a stable dispersion when other ingredients are added to it. The stabilizing agent can be a surfactant, a polymer, or mixtures thereof. If a polymer acts as a stabilizing agent, it is preferred that the polymer differ from the hydrophobic component used within the base composition previously described.

Additional stabilizing agents can include, but are not limited to, cationic surfactants such as quaternary amines; anionic surfactants such as sulfonates, carboxylates, and phosphates; or nonionic surfactants such as block copolymers containing ethylene oxide and silicone surfactants. The surfactants can be either external or internal. External surfactants do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts.

In some aspects, the stabilizing agent used within the composition to treat the surface of the present disclosure can be used in an amount ranging from greater than zero to about 60%, by of the hydrophobic component. For example, long chain fatty acids or salts thereof can be used from about 0.5% to about 10% by weight based on the amount of hydrophobic component. In other aspects, ethylene- acrylic acid or ethylene-methacrylic acid copolymers can be used in an amount up to about 80%, by weight based of hydrophobic component. In yet other aspects, sulfonic acid salts can be used in an amount from about 0.01% to about 60% by weight based on the weight of the hydrophobic component. Other mild acids, such as those in the carboxylic acid family (e.g., formic acid), can also be included in order to further stabilize the dispersion. In an aspect that includes formic acid, the formic acid can be present in amount that is determined by the desired pH of the dispersion wherein the pH is less than about 6.

Additional Fillers

The composition used to treat the surface of the present disclosure can further include one or more fillers. The composition can include from about 0.01 to about 600 parts, by weight of the hydrophobic component, for example, polyolefin and the stabilizing agent. In certain aspects, the filler loading in the composition can be from about 0.01 to about 200 parts by the weight of the hydrophobic component, for example, polyolefin, and the stabilizing agent. It is preferred that such filler material, if used, be hydrophilic. The filler material can include conventional fillers such as milled glass, calcium carbonate, aluminum trihydrate, talc, antimony trioxide, fly ash, clays (such as bentonite or kaolin clays for example), or other known fillers. Untreated clays and talc are usually hydrophilic by nature.

Substrates

The substrate of the present disclosure can be treated such that it is superhydrophobic throughout the z-directional thickness of the material and is controlled in such a way that only certain areas of the material are superhydrophobic. Such treatment can be designed to control which areas of the material can be penetrated by wetness, thereby controlling where liquid can flow.

Suitable substrates of the present disclosure can include a nonwoven fabric, woven fabric, knit fabric, or laminates of these materials. The substrate can also be a tissue or towel, as described herein. Materials and processes suitable for forming such substrate are generally well known to those skilled in the art. For instance, some examples of nonwoven fabrics that can be used in the present disclosure include, but are not limited to, spunbonded webs, meltblown webs, bonded carded webs, air-laid webs, coform webs, spunlace nonwoven web, hydraulically entangled webs, and the like. In each case, at least one of the fibers used to prepare the nonwoven fabric is a thermoplastic material containing fiber. In addition, nonwoven fabrics can be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present disclosure is a nonwoven fabric.

If desired, the nonwoven fabric can also be bonded using techniques well known in the art to improve the durability, strength, hand, aesthetics, texture, and/or other properties of the fabric. For instance, the nonwoven fabric can be thermally (e.g., pattern bonded, through-air dried), ultrasonically, adhesively and/or mechanically (e.g. needled) bonded. For instance, various pattern bonding techniques are described in U.S. Pat. No. 3,855,046 to Hansen; U.S. Pat. No. 5,620,779 to Levy, et al.; U.S. Pat. No. 5,962,112 to Haynes, et al.; U.S. Pat. No. 6,093,665 to Sayovitz, et al.; U.S. Design Pat. No. 428,267 to Romano, et al.; and U.S. Design Pat. No. 390,708 to Brown.

The nonwoven fabric can be bonded by continuous seams or patterns. As additional examples, the nonwoven fabric can be bonded along the periphery of the sheet or simply across the width or cross-direction (CD) of the web adjacent the edges. Other bond techniques, such as a combination of thermal bonding and latex impregnation, can also be used. Alternatively and/or additionally, a resin, latex or adhesive can be applied to the nonwoven fabric by, for example, spraying or printing, and dried to provide the desired bonding. Still other suitable bonding techniques can be described in U.S. Pat. No. 5,284,703 to Everhart, et al., U.S. Pat. No. 6,103,061 to Anderson, et al., and U.S. Pat. No. 6,197,404 to Varona.

In another aspect, the substrate of the present disclosure is formed from a spunbonded web containing monocomponent and/or multicomponent fibers. Multicomponent fibers are fibers that have been formed from at least two polymer components. Such fibers are usually extruded from separate extruders but spun together to form one fiber. The polymers of the respective components are usually different from each other although multicomponent fibers can include separate components of similar or identical polymeric materials. The individual components are typically arranged in substantially constantly positioned distinct zones across the cross-section of the fiber and extend substantially along the entire length of the fiber. The configuration of such fibers can be, for example, a side-by-side arrangement, a pie arrangement, or any other arrangement.

When utilized, multicomponent fibers can also be splittable. In fabricating multicomponent fibers that are splittable, the individual segments that collectively form the unitary multicomponent fiber are contiguous along the longitudinal direction of the multicomponent fiber in a manner such that one or more segments form part of the outer surface of the unitary multicomponent fiber. In other words, one or more segments are exposed along the outer perimeter of the multicomponent fiber. For example, splittable multicomponent fibers and methods for making such fibers are described in U.S. Pat. No. 5,935,883 to Pike and U.S. Pat. No. 6,200,669 to Marmon, et al.

The substrate of the present disclosure can also contain a coform material. The term "coform material" generally refers to composite materials including a mixture or stabilized matrix of thermoplastic fibers and a second non-thermoplastic material. As an example, coform materials can be made by a process in which at least one meltblown die head is arranged near a chute through which other materials are added to the web while it is forming. Such other materials can include, but are not limited to, fibrous organic materials such as woody or non-woody pulp such as cotton, rayon, recycled paper, pulp fluff and also superabsorbent particles, inorganic absorbent materials, treated polymeric staple fibers and the like. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Additionally, the substrate can also be formed from a material that is imparted with texture one or more surfaces. For instances, in some aspects, the substrate can be formed from a dual-textured spunbond or meltblown material, such as described in U.S. Pat. No. 4,659,609 to Lamers, et al. and U.S. Pat. No. 4,833,003 to Win, et al.

In one particular aspect of the present disclosure, the substrate is formed from a hydroentangled nonwoven fabric. Hydroentangling processes and hydroentangled composite webs containing various combinations of different fibers are known in the art. A typical hydroentangling process utilizes high pressure jet streams of water to entangle fibers and/or filaments to form a highly entangled consolidated fibrous structure, e.g., a nonwoven fabric. Hydroentangled nonwoven fabrics of staple length fibers and continuous filaments are disclosed, for example, in U.S. Pat. No. 3,494,821 to Evans and U.S. Pat. No. 4,144,370. Hydroentangled composite nonwoven fabrics of a continuous filament nonwoven web and a pulp layer are disclosed, for example, in U.S. Pat. No. 5,284,703 to Everhart, et al. and U.S. Pat. No. 6,315,864 to Anderson, et al.

Of these nonwoven fabrics, hydroentangled nonwoven webs with staple fibers entangled with thermoplastic fibers are especially suited as the substrate. In one particular example of a hydroentangled nonwoven web, the staple fibers are hydraulically entangled with substantially continuous thermoplastic fibers. The staple can be cellulosic staple fiber, non-cellulosic stable fibers, or a mixture thereof. Suitable non-cellulosic staple fibers includes thermoplastic staple fibers, such as polyolefin staple fibers, polyester staple fibers, nylon staple fibers, polyvinyl acetate staple fibers and the like, or mixtures thereof. Suitable cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers generally are composed of derivatives of cellulose formed by substitution of appropriate radicals (e.g., carboxyl, alkyl, acetate, nitrate, etc.) for hydroxyl groups along the carbon chain.

One particularly suitable hydroentangled nonwoven web is a nonwoven web composite of polypropylene spunbond fibers, which are substantially continuous fibers, having pulp fibers hydraulically entangled with the spunbond fibers. Another particularly suitable hydroentangled nonwoven web is a nonwoven web composite of polypropylene spunbond fibers having a mixture of cellulosic and non-cellulosic staple fibers hydraulically entangled with the spunbond fibers.

The substrate of the present disclosure can be prepared solely from thermoplastic fibers or can contain both thermoplastic fibers and non-thermoplastic fibers. Generally, when the substrate contains both thermoplastic fibers and non-thermoplastic fibers, the thermoplastic fibers make up from about 10% to about 90%, by weight of the substrate. In a particular aspect, the substrate contains between about 10% and about 30%, by weight, thermoplastic fibers.

Generally, a nonwoven substrate will have a basis weight in the range of about 17 gsm (grams per square meter) to about 200 gsm, more typically, between about 33 gsm to about 200 gsm. The actual basis weight can be higher than 200 gsm, but for many applications, the basis weight will be in the 33 gsm to 150 gsm range.

The thermoplastic materials or fibers making-up at least a portion of the substrate can essentially be any thermoplastic polymer. Suitable thermoplastic polymers include polyolefins, polyesters, polyamides, polyurethanes, polyvinylchloride, polytetrafluoroethylene, polystyrene, polyethylene terephthalate, biodegradable polymers such as polylactic acid and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(l-butene) and poly (2-butene); polypentene, e.g., poly(l-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof. These thermoplastic polymers can be used to prepare both substantially continuous fibers and staple fibers, in accordance with the present disclosure.

In another aspect, the substrate can be a tissue product. The tissue product can be of a homogenous or multi-layered construction, and tissue products made therefrom can be of a single-ply or multi-ply construction. The tissue product desirably has a basis weight of about 10 g/m2 to about 65 g/m2, and density of about 0.6 g/cc or less. More desirably, the basis weight will be about 40 g/m2 or less and the density will be about 0.3 g/cc or less. Most desirably, the density will be about 0.04 g/cc to about 0.2 g/cc. Unless otherwise specified, all amounts and weights relative to the paper are on a dry basis. Tensile strengths in the machine direction can be in the range of from about 100 to about 5,000 grams per inch of width. Tensile strengths in the cross-machine direction are from about 50 grams to about 2,500 grams per inch of width. Absorbency is typically from about 5 grams of water per gram of fiber to about 9 grams of water per gram of fiber.

Conventionally pressed tissue products and methods for making such products are well known in the art. Tissue products are typically made by depositing a papermaking furnish on a foraminous forming wire, often referred to in the art as a Fourdrinier wire. Once the furnish is deposited on the forming wire, it is referred to as a web. The web is dewatered by pressing the web and drying at elevated temperature. The particular techniques and typical equipment for making webs according to the process just described are well known to those skilled in the art. In a typical process, a low consistency pulp furnish is provided from a pressurized headbox, which has an opening for delivering a thin deposit of pulp furnish onto the Fourdrinier wire to form a wet web. The web is then typically dewatered to a fiber consistency of from about 7% to about 25% (total web weight basis) by vacuum dewatering and further dried by pressing operations wherein the web is subjected to pressure developed by opposing mechanical members, for example, cylindrical rolls. The dewatered web is then further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The formed sheets are considered to be compacted since the entire web is subjected to substantial mechanical compressional forces while the fibers are moist and are then dried while in a compressed state.

One particular aspect of the present disclosure utilizes an uncreped through-air-drying technique to form the tissue product. Through-air-drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Ruqowski, et al.; U.S. Pat. No. 6,017,417 to Wendt, et al., and U.S. Pat. No. 6,432,270 to Liu, et al. Uncreped through-air-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-air-drying to remove the water from the fibrous web; and (4) removing the dried fibrous web from the traveling foraminous belt.

EXAMPLES

Conventional scalable methods, such as spraying, can be used to apply a superhydrophobic coating on a surface. In one aspect, a hydrophilic micro/nano-fibrillated cellulose (MNFC) derived from cotton, available from North Carolina State University (NCSU): College of Textiles, with a fiber diameter of approximately 100 nm-10 μm and characteristic lengths of several hundred micrometers is used. As a hydrophobic component, a 20 wt. % dispersion in water of a fluorinated ethylene-acrylic acid co-polymer (PMC) in water is used, as obtained from DuPont (trade name CAPSTONE ST-100). Deionized water was used as a probe liquid for contact and roll-off tilt angle measurements.

The filler micro/nanofibrillated cellulose (MNFC) has both nanoscale and microscale dimensions, creating hierarchical roughness, which is highly desirable in superhydrophobic coatings. Many prior uses require nanoparticles such as TiO2 or other potentially harmful particles for roughness. These are undesirable from a processing standpoint due to their ability to become airborne and ingested, and are likewise undesirable for the end-user for the same size-scale related reasons. Not only do the cellulose particles pose no such threat, they are also extremely adherent to the substrate, making the coating more durable than similar superhydrophobic coatings.

The polymer PMC exhibits low surface energy and is frequently used to make superhydrophobic coatings. This is due to the long carbon chains that the fluorine groups are attached to. Previously, C8 carbon chains were desirable as they had even lower surface energy, but have since become a health concern. PMC has a major advantage as it incorporates C6 chemistry, which limits bioaccumulation and still allows for excellent hydrophobic performance. The elemental composition of PMC is shown in Table 1.

TABLE 1

| Elemental Composition of PMC | |
|---|---|
| Component | Atomic % |
| F1s | 29.97 |
| O1s | 12.99 |
| C1s | 57.04 |

MNFC-PMC dispersions were prepared by adding PMC to a MNFC solution to achieve one of several prescribed mass fraction ratios φ, defined as $$\varphi = \frac{m_{MNFC}}{m_{MNFC} + m_{PMC}}$$

Here $m_{MNFC}$ and $m_{PMC}$ are the masses of the MNFC and PMC on a dry basis, respectively. The selected ratios were φ=0.98, 0.96, 0.95, 0.94, 0.92, 0.9, 0.75, 0.5, and 0.25. Water was then added to dilute the solution to only 1 wt. % solids. Next, the solution was bath sonicated (Cole Parmer 8891) for 10 minutes, and then spray cast with an airbrush atomizer (Paasche, VL siphon feed, VLT-3 spray nozzle) on substrates appropriate for the necessary analysis (aluminum for SEM imaging and XPS plots, and glass for all other cases). Between spray passes excess water on the substrates was evaporated with a heat gun (Steinel Professional Heat Gun HL1810s, setting III). This protected the texture of the surfaces from the possibility of water droplets running down the surface and compromising the integrity of the final coating. Approximate exposure times under the heat gun were around 20 s on average, and never more than 60 s. Each freshly-coated sample was simply exposed until all water had evaporated from the surface. Care was taken to ensure the same coating weight (gsm) was deposited on all surfaces for consistency, where in general the coating weight was approximately 45 gsm. Afterward the substrates were placed on a hot plate at 150° C. for 30 min. at which temperature the MNFC suffers no structural damage.

Alternatively, a dip-coating method could be used in a two-step process. In this process, water was added to MNFC solutions until these contained 1 wt. % solids. The solutions were then bath sonicated and spray casted as mentioned above. It is important to note that in this process the amount of MNFC applied onto a substrate was varied (5 groups, A-E, see FIG. 1). Dip coating baths were then prepared with (i) 0.25, (ii) 0.5, and (iii) 1 wt. % PMC in water. Each of the 5 groups of varying MNFC coating content was completely submerged in the 3 different baths. After dip coating, the excess PMC was removed from the sides and bottom of the substrate with a paper towel and the system was heated on a hot plate at 150° C. for 10 min. in the same manner as above.

During spraying it is important to control as many of the variables as possible. The sprayer should always be kept orthogonal to the substrate surface, and roughly 12 inches away from the surface. The air pressure the sprayer is exposed to should be kept constant at 30 psi. A single spray pass should ideally wet the entire surface without depositing material on any already wet portion of the substrate. After each spray pass, the surface was subjected to air flow from a heat gun held roughly 2 feet from the surface, until the entire surface became dry. Then subsequent spray passes can be performed in an identical manner.

Some technical difficulties are typically encountered when spraying water-based dispersions: The first major problem is insufficient evaporation of the fluid during atomization and a high degree of wetting of the dispersion onto the coated substrate, both resulting in non-uniform coatings due to contact line pinning and the so called "coffee-stain effect" when the water eventually evaporates. The second major challenge is the relatively large surface tension of water when compared with other solvents used for spray coating. Water, due to its high surface tension, tends to form non-uniform films in spray applications, thus requiring great care to ensure that a uniform coating is attained. This is especially critical for hydrophobic substrates where the water tends to bead and roll. It was observed that the best approach for applying the aqueous dispersions of the present disclosure was to produce extremely fine droplets during atomization, and to apply only very thin coatings, so as not to saturate the substrate and re-orient hydrogen bonding within the substrate which, after drying, would cause cellulosic substrates (e.g. paper towel) to become stiff.

Contact angle values can be obtained by a backlit optical image setup utilizing a CCD camera. For dynamic contact angle hysteresis measurements (which designate the self-cleaning property), the CCD camera can be replaced by a high-speed camera, such as REDLAKE Motion Pro camera, to accurately capture advancing and receding contact angle values. The lower the difference between advancing and receding contact angles (i.e. contact angle hysteresis), the more self-cleaning the surface is.

Figure 1:
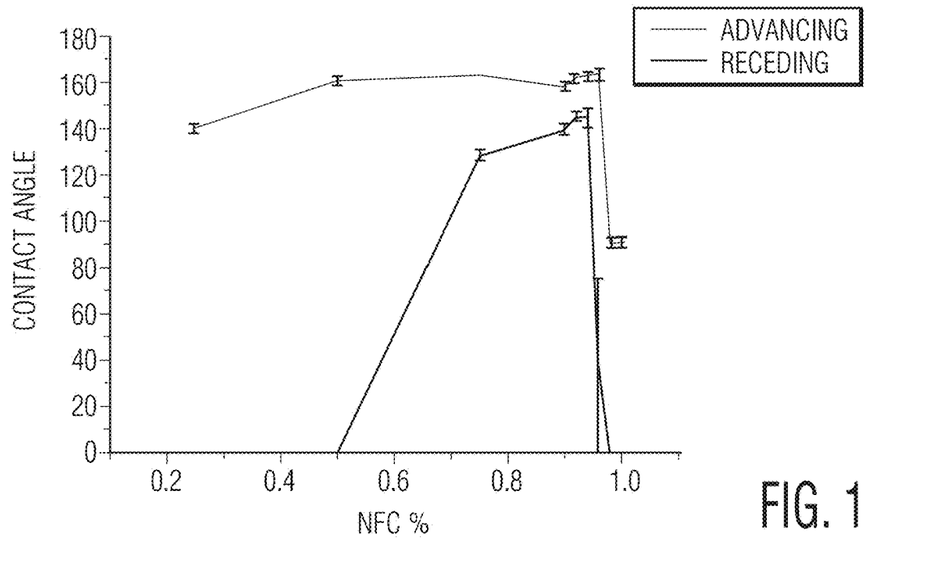
FIG. 1 illustrates contact angles for a range of micro/nano-fibrillated cellulose (MNFC) mass fractions.
Figure 2:
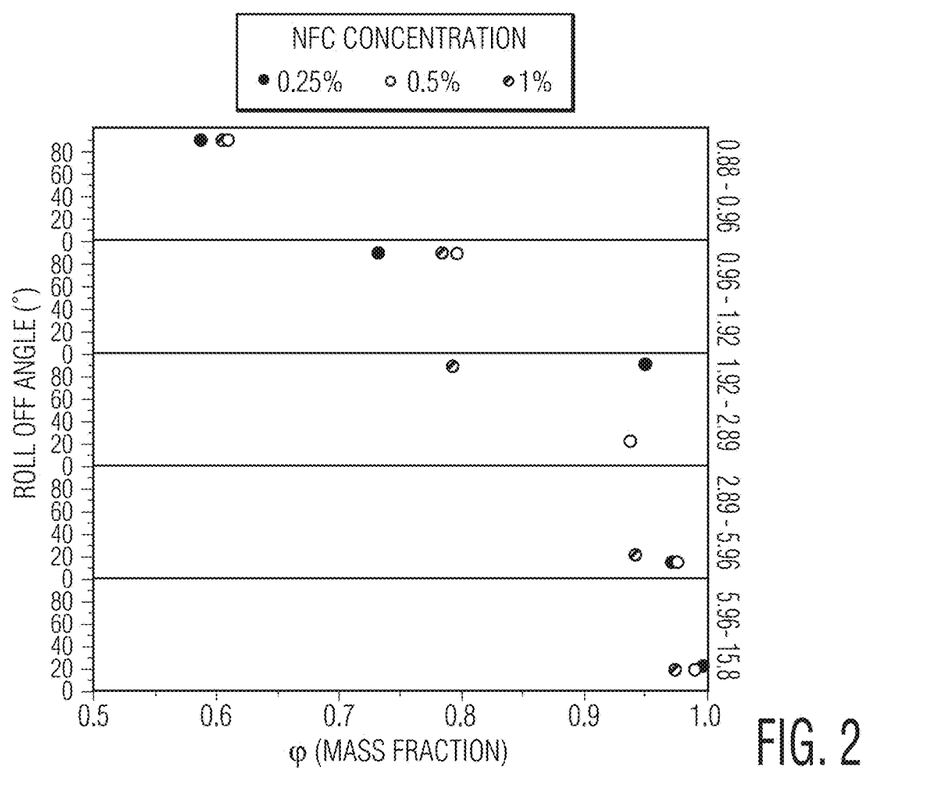
FIG. 2 illustrates the roll off angle from 0° to 90° for a range of five different amounts of MNFC deposited, and three different fluorinated acrylic co-polymer (PMC) bath concentrations (solid circle, empty circle, cross-hatched circle)
Figure 3:
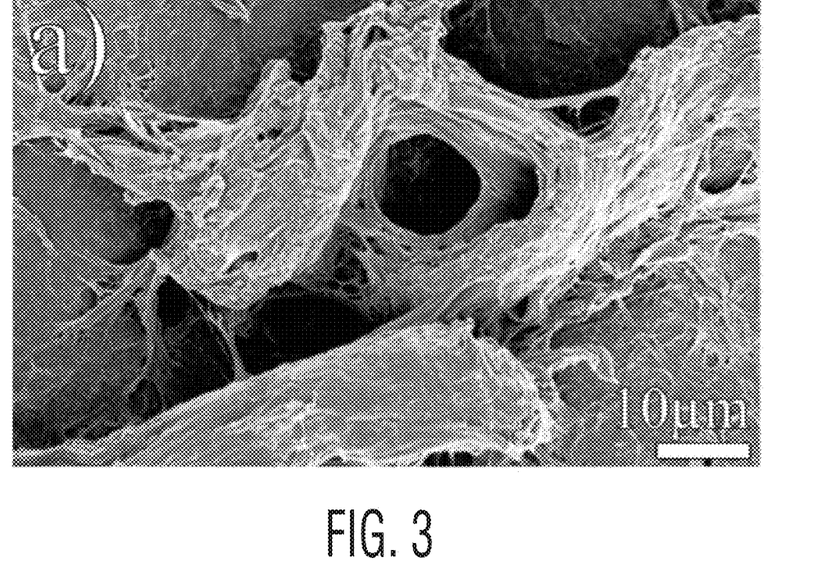
FIG. 3 illustrates through a scanning electron microscope (SEM) image the structure of an MNFC surface without PMC content.
Figure 4:
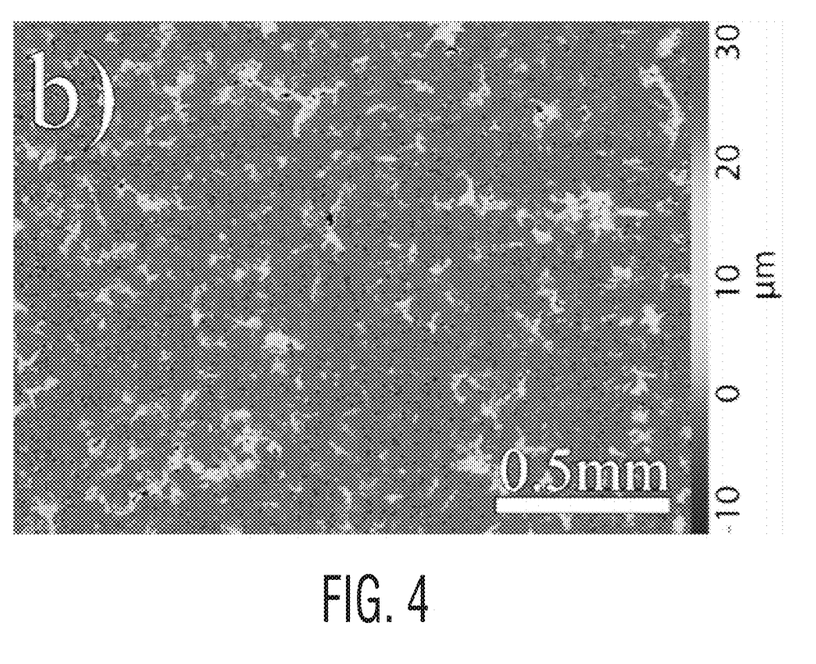
FIG. 4 illustrates through a surface topology profile or depth image the MNFC surface without PMC content as shown in FIG. 3.

Total solids content was varied; see values of $\varphi$ listed above. To avoid obscuring the texture of the MNFC particles, low PMC content was necessary. With less than 4% PMC content, it seems there was insufficient polymer to uniformly coat the cellulose fibrils. Advancing and receding contact angles, as used here, give a better idea of droplet mobility than sessile angles. The magnitude of the difference between advancing and receding angles is known as hysteresis. When this value approaches zero, it indicates the best self-cleaning performance possible. FIG. 1 illustrates contact angles for a range of MNFC mass fractions. As shown in FIG. 1, the highest contact angles and lowest hysteresis are seen in the range of $0.9<\varphi<0.94$. FIG. 2 illustrates the roll off angle from 0° to 90° for a range of five different amounts of MNFC deposited, and three different PMC bath concentrations (red, blue, and green).

The manner of preparing dip coated samples gave rise to 15 unique MNFC-PMC coatings, therefore it was important to record the coating weights between intermittent steps (e.g., MNFC coating weight, MNFC+PMC coating weight) to calculate the correct mass fraction $\varphi$ of dry MNFC-PMC in the end product, which performs similarly to the comparable $\varphi$ values listed above for samples following the one-step spray process. The lowest roll-off angles are obtained with little regard to PMC bath concentration and with very high $\varphi$.

Figure 5:
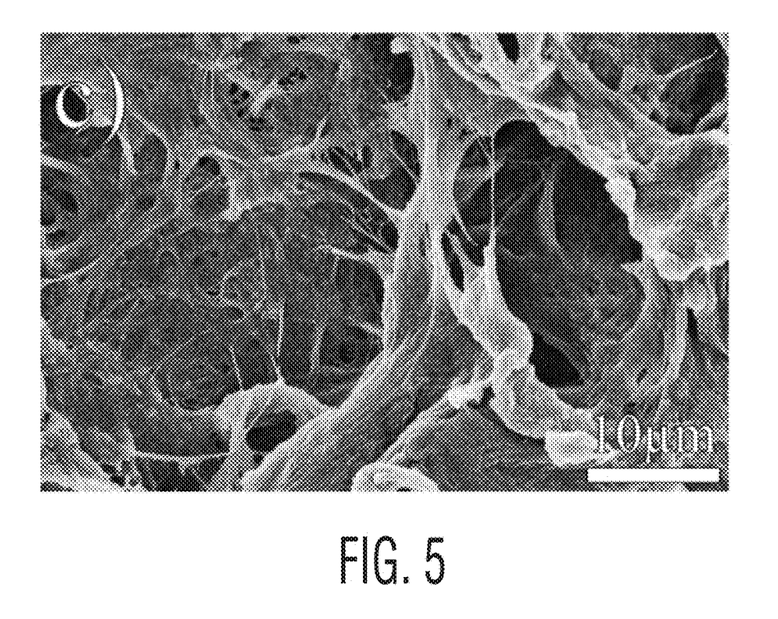
FIG. 5 illustrates through an SEM image the structure of an MNFC surface with PMC content.
Figure 6:
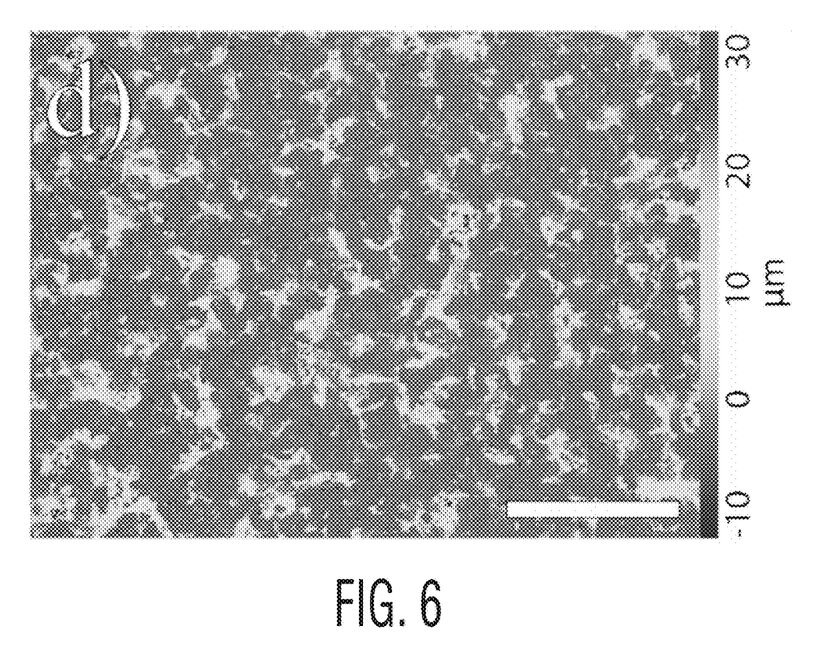
FIG. 6 illustrates through a surface topology profile or depth image the MNFC surface with PMC content as shown in FIG. 5.

FIGS. 3-6 show SEM images and surface topology profiles for MNFC without PMC (FIGS. 3 and 4) and with PMC (FIGS. 5 and 6). FIGS. 5 and 6 represent $\varphi=0.95$. Any concern that added PMC would create smoother coatings is eliminated by observing the profile images where more dramatic texture is shown for the MNFC-PMC coating in FIG. 6 than for the MNFC coating alone in FIG. 4. Further evidence that MNFC-PMC coatings have more pronounced roughness than a MNFC coating alone is given by the roughness values of Ra=2.73 μm for the MNFC-PMC coating and Ra=1.272 μm for the MNFC coating. As demonstrated in the SEM images of FIGS. 3 and 5, the range of feature scales present in the use of MNFC create a hierarchical surface roughness that is extremely advantageous for superhydrophobicity. Spray deposition is critical to realizing this roughness on all substrates. The fibrils, instead of forming a smooth polymer layer as may be expected, are emergent.

In a first particular aspect, a composition configured to create a superhydrophobic surface includes a fluorinated hydrophobic component dispersible in an aqueous dispersion; cellulosic elements of a size ranging from 100 nm to 100 μm; and water.

A second particular aspect includes the first particular aspect, wherein the cellulosic elements are particles and/or fibers.

A third particular aspect includes the first and/or second aspect, wherein the composition is configured to be applied to a surface such that the surface exhibits a contact angle greater than 150 degrees.

A fourth particular aspect includes one or more of aspects 1-3, wherein the composition is configured to be applied to a surface such that the surface exhibits a roll off angle less than 10 degrees.

A fifth particular aspect includes one or more of aspects 1-4, wherein the surface exhibits contact angle hysteresis less than 20 degrees.

A sixth particular aspect includes one or more of aspects 1-5, wherein the fluorinated hydrophobic component is a fluorinated ethylene-acrylic acid co-polymer.

A seventh particular aspect includes one or more of aspects 1-6, wherein the cellulosic elements are micro- and nano-fibrillated cellulose.

An eighth particular aspect includes one or more of aspects 1-7, wherein the hydrophobic component is selected from the group consisting of fluorinated polymers, perfluorinated polymers, and mixtures thereof.

A ninth particular aspect includes one or more of aspects 1-8, wherein the hydrophobic component and cellulosic elements are present in an amount of from about 0.1% to about 5.0%, by weight of the dispersion.

A tenth particular aspect includes one or more of aspects 1-9, wherein the hydrophobic component and cellulosic elements are present in an amount of from about 1.0% to about 3.0%, by weight of the dispersion.

An eleventh particular aspect includes one or more of aspects 1-10, wherein the ratio of the hydrophobic component to the cellulosic elements is from about 1:4 to about 4:1.

A twelfth particular aspect includes one or more of aspects 1-11, wherein the fluorinated hydrophobic component is a plurality of hydrophobic components.

A thirteenth particular aspect includes one or more of aspects 1-12, the composition further comprising a stabilizing agent.

A fourteenth particular aspect includes one or more of aspects 1-13, the composition further comprising a filler or a binder.

In a fifteenth particular aspect, a composition configured to create a superhydrophobic surface includes a fluorinated hydrophobic component dispersible in an aqueous dispersion, wherein the hydrophobic component is selected from the group consisting of fluorinated polymers, perfluorinated polymers, and mixtures thereof; cellulosic elements of a size ranging from 100 nm to 100 µm, wherein the cellulosic elements are micro- and nano-fibrillated cellulose; and water.

A sixteenth particular aspect includes the fifteenth aspect, wherein the fluorinated hydrophobic component is a fluorinated ethylene-acrylic acid co-polymer.

A seventeenth particular aspect includes the fifteenth and/or sixteenth aspects, wherein the composition is configured to be applied to a surface such that the surface exhibits a contact angle greater than 150 degrees.

In an eighteenth particular aspect, a disposable absorbent article includes a substrate having a surface, the surface including a composition including a fluorinated hydrophobic component dispersible in an aqueous dispersion; cellulosic elements of a size ranging from 100 nm to 100 µm; and water, wherein the surface exhibits a contact angle greater than 150 degrees.

A nineteenth particular aspect includes the eighteenth aspect, wherein the fluorinated hydrophobic component is a fluorinated ethylene-acrylic acid co-polymer.

A twentieth particular aspect includes the eighteenth and/or nineteenth aspects, wherein the cellulosic elements are micro- and nano-fibrillated cellulose.

All documents cited herein are, in relevant part, incorporated herein by reference; the citation of any document is not to be construed as an admission that it is prior art with respect to the present disclosure. To the extent that any meaning or definition of a term in this document conflicts with any meaning or definition of the same term in a document incorporated by reference, the meaning or definition assigned to that term in this document shall govern.

These and other modifications and variations to the present disclosure can be practiced by those of ordinary skill in the art, without departing from the spirit and scope of the present disclosure, which is more particularly set forth in the appended claims. In addition, it should be understood that aspects of the various aspects of the present disclosure can be interchanged either in whole or in part. Furthermore, those of ordinary skill in the art will appreciate that the foregoing description is by way of example only, and is not intended to limit the disclosure so further described in such appended claims.

What is claimed is:

1. A composition configured to create a superhydrophobic surface, the composition comprising:
    a fluorinated hydrophobic component dispersible in an aqueous dispersion;
    cellulosic elements of a size ranging from 100 nm to 100 µm; and
    water.

2. The composition of claim 1, wherein the cellulosic elements are particles and/or fibers.

3. The composition of claim 1, wherein the composition is configured to be applied to a surface such that the surface exhibits a contact angle greater than 150 degrees.

4. The composition of claim 1, wherein the composition is configured to be applied to a surface such that the surface exhibits a roll off angle less than 10 degrees.

5. The composition of claim 1, wherein the surface exhibits contact angle hysteresis less than 20 degrees.

6. The composition of claim 1, wherein the fluorinated hydrophobic component is a fluorinated ethylene-acrylic acid co-polymer.

7. The composition of claim 1, wherein the cellulosic elements are micro- and nano-fibrillated cellulose.

8. The composition of claim 1, wherein the hydrophobic component is selected from the group consisting of fluorinated polymers, perfluorinated polymers, and mixtures thereof.

9. The composition of claim 1, wherein the hydrophobic component and cellulosic elements are present in an amount of from about 0.1% to about 5.0%, by weight of the dispersion.

10. The composition of claim 1, wherein the hydrophobic component and cellulosic elements are present in an amount of from about 1.0% to about 3.0%, by weight of the dispersion.

11. The composition of claim 1, wherein the ratio of the hydrophobic component to the cellulosic elements is from about 1:4 to about 4:1.

12. The composition of claim 1, wherein the fluorinated hydrophobic component is a plurality of hydrophobic components.

13. The composition of claim 1, the composition further comprising a stabilizing agent.

14. The composition of claim 1, the composition further comprising a filler or a binder.

15. A composition configured to create a superhydrophobic surface, the composition comprising:
    a fluorinated hydrophobic component dispersible in an aqueous dispersion, wherein the hydrophobic component is selected from the group consisting of fluorinated polymers, perfluorinated polymers, and mixtures thereof;
    cellulosic elements of a size ranging from 100 nm to 100 µm, wherein the cellulosic elements are micro- and nano-fibrillated cellulose; and
    water.

16. The composition of claim 15, wherein the fluorinated hydrophobic component is a fluorinated ethylene-acrylic acid co-polymer.

17. The composition of claim 15, wherein the composition is configured to be applied to a surface such that the surface exhibits a contact angle greater than 150 degrees.

18. A disposable absorbent article comprising a substrate having a surface, the surface including a composition comprising a fluorinated hydrophobic component dispersible in an aqueous dispersion; cellulosic elements of a size ranging from 100 nm to 100 µm; and water, wherein the surface exhibits a contact angle greater than 150 degrees.

19. The disposable absorbent article of claim 17, wherein the fluorinated hydrophobic component is a fluorinated ethylene-acrylic acid co-polymer.

20. The disposable absorbent article of claim 17, wherein the cellulosic elements are micro- and nano-fibrillated cellulose.

* * * * *